United States Patent
Dubey et al.

(10) Patent No.: US 10,091,161 B2
(45) Date of Patent: Oct. 2, 2018

(54) ASSIGNMENT OF ROUTER ID FOR LOGICAL ROUTERS

(71) Applicant: Nicira, Inc., Palo Alto, CA (US)

(72) Inventors: Ankur Dubey, Santa Clara, CA (US); Sami Boutros, Union City, CA (US)

(73) Assignee: NICIRA, INC., Palo Alto, CA (US)

( * ) Notice: Subject to any disclaimer, the term of this patent is extended or adjusted under 35 U.S.C. 154(b) by 32 days.

(21) Appl. No.: 15/146,339

(22) Filed: May 4, 2016

(65) Prior Publication Data

US 2017/0317971 A1 Nov. 2, 2017

Related U.S. Application Data

(60) Provisional application No. 62/330,106, filed on Apr. 30, 2016.

(51) Int. Cl.
*H04L 12/28* (2006.01)
*H04L 29/12* (2006.01)
(Continued)

(52) U.S. Cl.
CPC ...... *H04L 61/2061* (2013.01); *H04L 41/0893* (2013.01); *H04L 45/42* (2013.01); *H04L 45/586* (2013.01)

(58) Field of Classification Search
CPC ......... H04L 29/08648; H04L 29/12009; H04L 29/12207; H04L 29/12283; H04L 45/72; H04L 45/74; H04L 45/745; H04L 61/20
See application file for complete search history.

(56) References Cited

U.S. PATENT DOCUMENTS

| | | | |
|---|---|---|---|
| 5,504,921 A | 4/1996 | Dev et al. | |
| 5,550,816 A | 8/1996 | Hardwick et al. | |
| (Continued) | | | |

FOREIGN PATENT DOCUMENTS

| | | |
|---|---|---|
| CN | 106134137 A | 11/2016 |
| CN | 107534578 A | 1/2018 |
| (Continued) | | |

OTHER PUBLICATIONS

Lin, Pingping, et al., "Seamless Interworking of SDN and IP," SIGCOMM'13, Aug. 12-16, 2013, 2 pages, ACM, New York, USA.

(Continued)

*Primary Examiner* — Kan Yuen
(74) *Attorney, Agent, or Firm* — Adeli LLP

(57) ABSTRACT

Some embodiments provide a method for determining a router identifier for a centralized routing component of a logical router. The method determines that a dynamic routing protocol is enabled for the centralized routing component. When a router identifier was previously stored for the centralized routing component, the method assigns the stored router identifier as the router identifier for the centralized routing component only when the stored router identifier matches one of a set of valid addresses for the centralized routing component. When the centralized routing component does not have a previously stored router identifier that matches one of the set of valid addresses, the method assigns one of the set of valid addresses as the router identifier for the centralized routing component according to a hierarchy among the set of valid addresses.

21 Claims, 6 Drawing Sheets

(51) Int. Cl.
*H04L 12/717* (2013.01)
*H04L 12/713* (2013.01)
*H04L 12/24* (2006.01)

(56) References Cited

U.S. PATENT DOCUMENTS

| | | | |
|---|---|---|---|
| 5,751,967 A | 5/1998 | Raab et al. |
| 6,006,275 A | 12/1999 | Picazo, Jr. et al. |
| 6,104,699 A | 8/2000 | Holender et al. |
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,754,220 B1 | 6/2004 | Lamberton et al. |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,428,220 B1 | 9/2008 | Caronni et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,519,734 B1 | 4/2009 | Dumitriu et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,647,426 B2 | 1/2010 | Patel et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,014,278 B1 | 9/2011 | Subramanian et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,762,507 B1 | 6/2014 | Ingram et al. |
| 8,958,298 B2 | 2/2015 | Zhang et al. |
| 8,997,094 B2 | 3/2015 | Bosch et al. |
| 9,059,999 B2 | 6/2015 | Koponen et al. |
| 9,203,703 B2 | 12/2015 | Koponen et al. |
| 9,225,597 B2 | 12/2015 | Tubaltsev et al. |
| 9,503,371 B2 | 11/2016 | Thakkar et al. |
| 9,577,845 B2 | 2/2017 | Thakkar et al. |
| 9,590,901 B2 | 3/2017 | Tubaltsev et al. |
| 2001/0043614 A1 | 11/2001 | Viswanadham et al. |
| 2002/0093952 A1 | 7/2002 | Gonda |
| 2002/0095498 A1 | 7/2002 | Chanda et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056317 A1 | 3/2006 | Manning et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0198321 A1 | 9/2006 | Nadeau et al. |
| 2006/0291388 A1 | 12/2006 | Amdahl et al. |
| 2007/0028244 A1 | 2/2007 | Landis et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0140235 A1 | 6/2007 | Aysan et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0031263 A1 | 2/2008 | Ervin et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | De Heer |
| 2008/0189769 A1 | 8/2008 | Casado et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |

(56) References Cited

U.S. PATENT DOCUMENTS

| | | |
|---|---|---|
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1* | 10/2009 | Yan ........................ H04L 45/02 370/401 |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0121209 A1 | 5/2013 | Padmanabhan et al. |
| 2013/0125120 A1 | 5/2013 | Zhang et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0250951 A1 | 9/2013 | Koganti |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0050218 A1 | 2/2014 | Kamble et al. |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0372582 A1 | 12/2014 | Ghanwani et al. |
| 2015/0009831 A1 | 1/2015 | Graf |
| 2015/0010009 A1* | 1/2015 | Takahashi ........... H04L 12/4633 370/397 |
| 2015/0063360 A1 | 3/2015 | Thakkar et al. |
| 2015/0263899 A1 | 9/2015 | Tubaltsev et al. |
| 2015/0263946 A1 | 9/2015 | Tubaltsev et al. |
| 2015/0271011 A1* | 9/2015 | Neginhal ............ H04L 41/0803 370/254 |
| 2016/0080483 A1 | 3/2016 | Li et al. |
| 2016/0294612 A1 | 10/2016 | Ravinoothala et al. |
| 2017/0142012 A1 | 5/2017 | Thakkar et al. |
| 2017/0163532 A1 | 6/2017 | Tubaltsev et al. |
| 2017/0317954 A1 | 11/2017 | Masurekar et al. |
| 2018/0006880 A1 | 1/2018 | Shakimov et al. |

FOREIGN PATENT DOCUMENTS

| | | | |
|---|---|---|---|
| EP | | 1653688 A1 | 5/2006 |
| EP | | 2849395 A1 | 3/2015 |
| EP | | 3117561 A2 | 1/2017 |
| GB | | 2419703 | 5/2006 |
| JP | | 2003069609 A | 3/2003 |
| JP | | 2003124976 A | 4/2003 |
| JP | | 2003318949 A | 11/2003 |
| WO | | 2005112390 A1 | 11/2005 |
| WO | | 2008095010 A1 | 8/2008 |
| WO | WO 2013/113265 | | 8/2013 |
| WO | | 2015138043 A2 | 9/2015 |
| WO | WO 2015/142404 | | 9/2015 |
| WO | | 2016164277 A1 | 10/2016 |

OTHER PUBLICATIONS

Mechtri, Marouen, et al., "Inter and Intra Cloud Networking Gateway as a Service," 2013 IEEE 2$^{nd}$ International Conference on Cloud Networking (ClouNet), Nov. 11, 2013, pages, IEEE.

Aggarwal, R, et al., "Data Center Mobility based on E-VPN, BGP/MPLS IP VPN, IP Routing and NHRP; draft-raggarwa-datacenter-mobility-05.txt," Jun. 10, 2013, 24 pages, Internet Engineering Task Force, IETF, Standardworkingdraft, Internet Society (ISOC) 4, Rue Des Falaises CFI-1205, Geneva, Switzerland.

Caesar, Matthew, et al., "Design and Implementation of a Routing Control Platform," NSDI '05: 2nd Symposium on Networked Systems Design & Implementation, Apr. 2005, 14 pages, USENIX Association.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al. (U.S. Appl. No. 61/514,990), filed Aug. 4, 2011.

Handley, Mark, et al., "Designing Extensible IP Router Software," Proc. of NSDI, May, 2005,14 pages.

Koponen, Teemu, et al., "Network Virtualization in Multi-tenant Datacenters," Technical Report TR-2013-001E, International Com-

(56) References Cited

OTHER PUBLICATIONS puter Science Institute & UC Berkeley, Aug. 2013, 22 pages, VMware, Inc., Palo Alto, CA, USA.

Lakshminarayanan, Karthik, et al., "Routing as a Service," Month Unknown, 2004, 16 pages, Berkeley, California.

Maltz, David A., et al., "Routing Design in Operational Networks: A Look from the Inside," SIGCOMM'04, Aug. 30 2004-Sep. 3, 2004, 14 pages, ACM, Portland, Oregon, USA.

Rosen, E., et al., "Applicability Statement for BGP.MPLS IP Virtual Private Networks (VPNs)," The Internet Society, RFC 4365, Feb. 2006, 33 pages.

Shenker, Scott, et al., "The Future of Networking, and the Past of Protocols," Dec. 2, 2011, 30 pages, USA.

Wang, Wei-Ming, et al., "Analysis and Implementation of an Open Programmable Router Based on Forwarding and Control Element Separation," Journal of Computer Science and Technology, Sep. 2008, 11 pages, vol. 23, No. 5.

Non-Published Commonly Owned U.S. Appl. No. 15/387,549 (N365), filed Dec. 21, 2016, 55 pages, Nicira, Inc.

Non-Published Commonly Owned U.S. Appl. No. 15/451,372, filed Mar. 6, 2017, 32 pages, Nicira, Inc.

\* cited by examiner

ASSIGNMENT OF ROUTER ID FOR LOGICAL ROUTERS

BACKGROUND

In physical L3 networks, such as the Internet, routers exchange routing and reachability information using various routing protocols, including Border Gateway Protocol (BGP) and Open Shortest Path First (OSPF). A primary functionality of these protocols is to allow two routers to exchange information advertising available routes or routes that are no longer available. That is, a first router may use this protocol to inform a second router that packets for a given IP address or IP prefix can be sent to the first router. The second router can then use this information to calculate routes.

Within some managed virtualized networks, routes are calculated by a network controller and distributed to the forwarding elements that handle routing within the managed network. As the controller directs how these forwarding elements will route packets, there is no need for the exchange of routing information between the forwarding elements. However, these managed virtualized networks may send and receive traffic through external networks. As such, techniques for enabling the use of dynamic routing protocols between the logical networks and physical networks are needed.

BRIEF SUMMARY

Some embodiments provide a method for selecting a router identifier for a centralized routing component of a logical router. The centralized routing component (or an associated module) uses the routing identifier to perform dynamic routing protocol (e.g., BGP, OSPF, etc.). The dynamic routing protocol enables the centralized routing component to exchange routing information with a physical router external to the logical network that contains the logical router.

The logical network, in some embodiments, contains at least one layer of logical router as well as logical switches to which data compute nodes (virtual machines, containers, physical hosts, etc.) connect. The logical routers may include a tier of routers that provides a connection to external networks for the logical network. In some embodiments, logical switches connect directly to this top tier of logical routers, while on other embodiments at least one additional tier of logical routers separates the logical switches (and data compute nodes). The logical routers in the top tier, that provide the connection to external networks, include the centralized routing components for which the router identifier is selected.

The centralized routing components of a logical router each operate on a separate host machine in some embodiments, often alongside centralized routing components of other logical routers. In addition, in some embodiments, a network controller (referred to as a local controller) operates on each of the host machines. The local controller configures the centralized routing component according to configuration data (e.g., logical network configuration information, routing table, etc.) received from a centralized network controller. In addition, the local controller of some embodiments selects a router identifier for the centralized routing component based on the configuration data for the component. In some embodiments, either the local controller or the centralized routing component executes the dynamic routing protocol. In other embodiments, however, a separate module operating on the host machine executes the dynamic routing protocol for the centralized routing component. Furthermore, in some embodiments, this separate module also executes the dynamic routing protocol for centralized routing components of other logical routers that also operate on the same host machine.

To select a router identifier for a particular centralized routing component, the method of some embodiments first identifies whether dynamic routing is enabled for the routing component. Assuming dynamic routing is enabled, the method determines whether a routing identifier was persisted for the routing component. Some embodiments persist the router identifier when the identifier is selected, so that if a routing component is required to restart it can use the same router identifier after the restart (thereby avoiding interruption of the routing protocol). However, before simply using the persisted identifier, the method determines whether the persisted identifier remains a valid identifier for the routing component. In some embodiments, an identifier is valid if the identifier is either an address (e.g., IP address) of the loopback interface of the routing component (if the routing component has a loopback interface) or an address (e.g., IP address) of an uplink of the logical router that is assigned to the centralized routing component.

If no router identifier is persisted for the centralized routing component, the method attempts to find an identifier from a set of valid addresses. If the centralized routing component has a loopback interface, then the method uses the address of this loopback interface as the router identifier. If no loopback interface exists, however (e.g., because none is configured for the routing component), then the method selects the highest address (e.g., with 10.1.1.2 being a higher address than 10.1.1.1) of the uplinks configured for the centralized routing component. These uplinks are the logical router interfaces that connect to the external physical network, and one or more may be configured on each centralized routing component. If no loopback interface is configured and no uplinks are available (e.g., because all uplinks on the routing component are inactive, then the method does not select a router identifier and dynamic routing is not used for the routing component.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for selecting a router identifier for a centralized routing component (also referred to as a service router, or SR) of a logical router. The SR (or an associated dynamic routing module) uses the routing identifier to perform a dynamic routing protocol (e.g., BGP, OSPF, etc.). The dynamic routing protocol enables the SR to exchange routing information with a physical router external to the logical network that contains the logical router.

Figure 1:
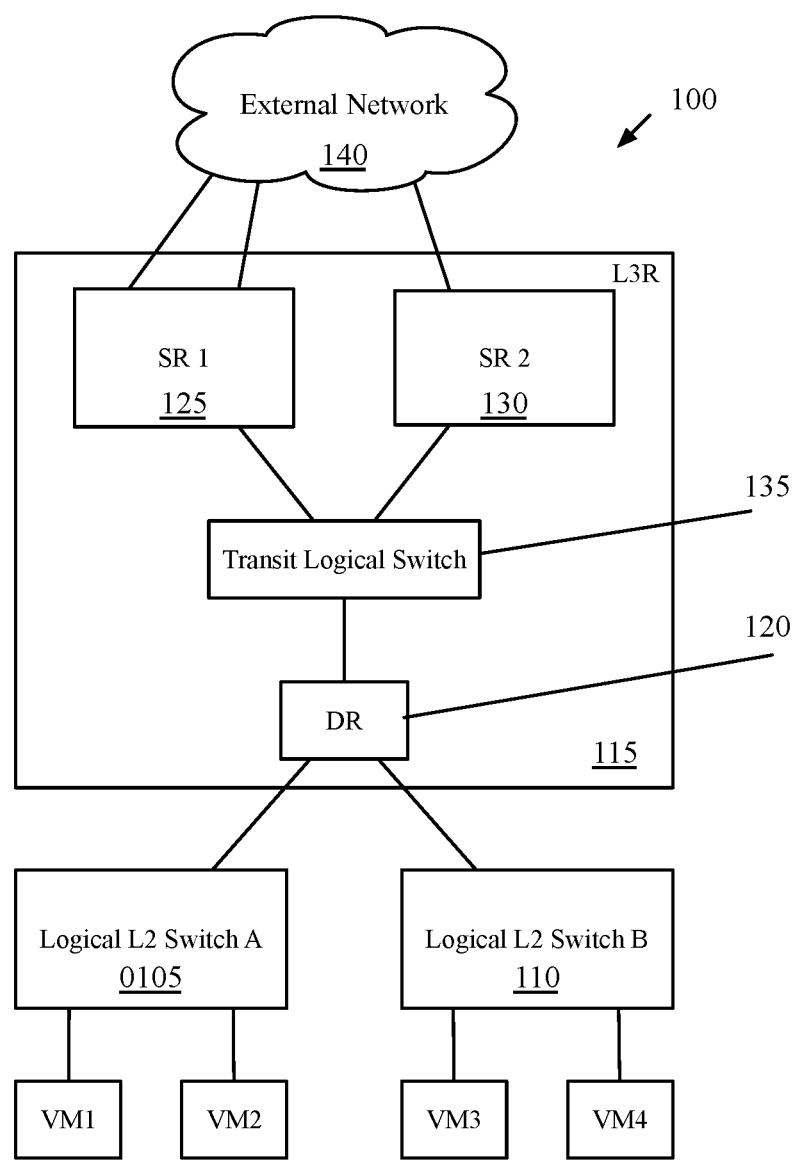
FIG. 1 conceptually illustrates a logical network of some embodiments.

FIG. 1 conceptually illustrates a logical network 100 of some embodiments. This logical network 100 includes two logical switches 105 and 110 that connect to a logical router 115. Data compute nodes connect to each of the logical switches. In this case, the data compute nodes are virtual machines, but other embodiments may have virtual machines, containers, physical hosts, etc., or a combination thereof. While this example logical network includes a single logical router, some embodiments may contain more than one layer of logical routers. For example, in some embodiments, the logical network includes a layer of logical routers configured by datacenter tenants to which the tenants' logical switches connect, as well as a layer of logical routers configured by a datacenter provider that is responsible for connecting the tenant logical networks to external networks. The top layer of logical router (those connecting to the external networks) may execute dynamic routing protocols to communicate with physical routers in the external networks, and thus their physical implementation(s) require a routing identifier.

As shown, the logical router 115 includes multiple routing components, including a distributed routing component 120 (also referred to as a distributed router, or DR) and two centralized routing components 125 and 130 (SR1 and SR2). These three components of the logical router are internally connected by a logical switch 135, referred to as a transit logical switch. In some embodiments, the user that configures the logical router simply configures a logical router, and a network control system responsible for translating the logical network configuration into a physical realization defines the components of the logical router. Some embodiments define a DR for each logical router, and then define SRs (and the internal transit logical switch) if the logical router includes uplinks that connect to external networks. Some embodiments assign one SR for each uplink, while other embodiments allow multiple uplinks on a single SR. In the example, the first SR 125 includes two uplinks that connect to an external network 140 and the second SR 130 includes a single uplink that connects to the external network 140. These uplinks may have the same connectivity (i.e., connect to the same physical routers) or have different connectivity in different embodiments.

In this example, the two SRs are arranged in an active-active configuration; that is, they both implement separate uplinks of the logical router and are both actively processing traffic for the logical router at the same time. However, other embodiments may have two or more SRs arranged in an active-standby configuration. In both cases, if multiple SRs are performing dynamic routing on separate host machines, then the local controllers on each of those host machines assigns them their own router identifiers.

Figure 2:
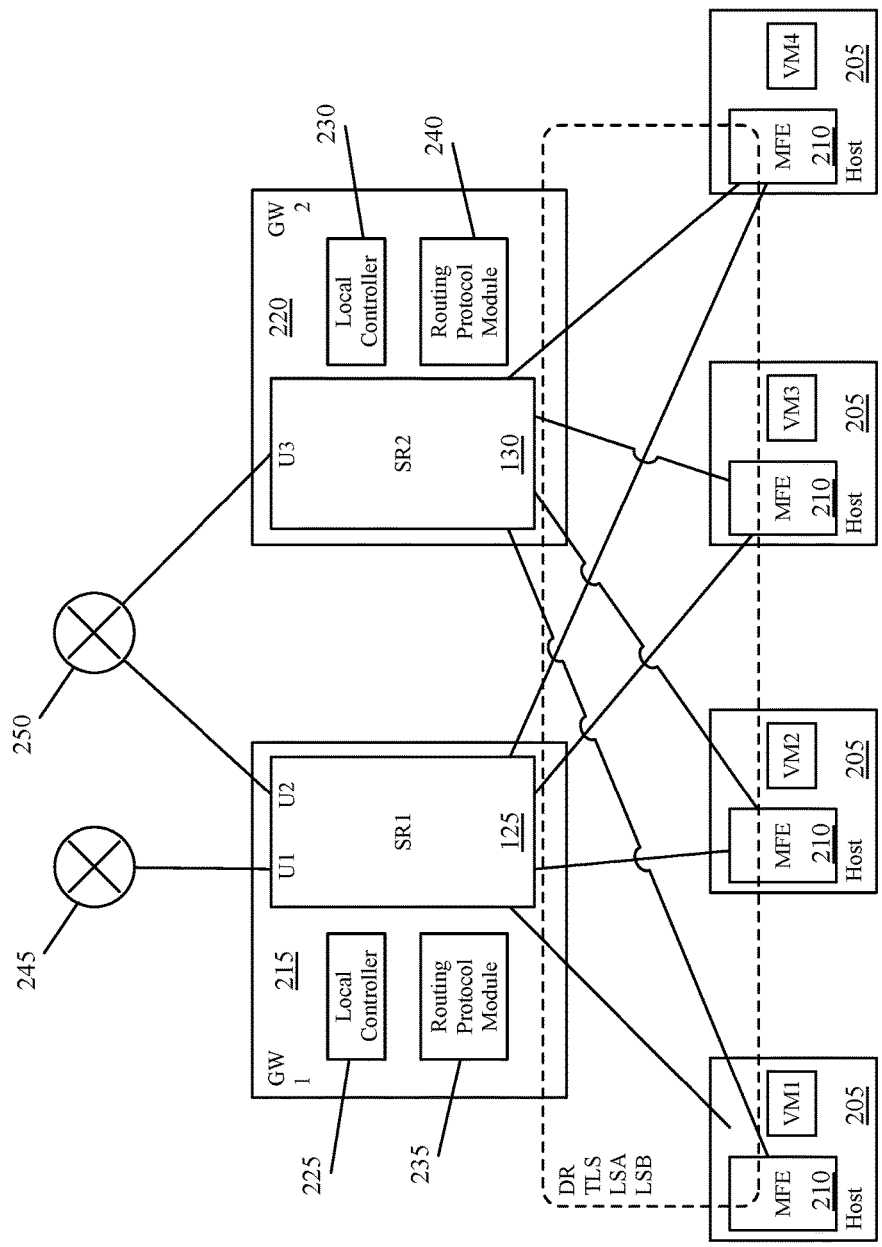
FIG. 2 conceptually illustrates a physical implementation of the logical network of FIG. 1 according to some embodiments.

FIG. 2 conceptually illustrates a physical implementation of the logical network 100 of some embodiments. In this example, each of the VMs from the logical network 100 operates on a separate physical host 205, on which a managed forwarding element 210 (or set of managed forwarding elements) operates. These sets of managed forwarding elements (MFEs) on each of the hosts are software forwarding elements that implement the distributed logical entities, such as the logical switches 105 and 110 as well as the distributed routing component 120 and transit logical switch 125. In some embodiments, each MFE 210 is a single software module (e.g., a flow-based MFE such as Open vSwitch), while in other embodiments each MFE 210 represents multiple software modules that operate together in virtualization software of the host machine (e.g., a virtual switch and virtual distributed router operating within an ESX hypervisor).

In addition, each of the SRs 125 and 130 operate on a separate gateway host machine 215 and 220, respectively. Gateway host machines may be separate machines in the datacenter that are specifically allocated for hosting centralized routing components that provide connection to the external networks. Though not shown in this figure, other SRs of other logical routers also operate on these host machines in some embodiments. Furthermore, the host machines (e.g., MFEs on the host machines) implement the distributed logical forwarding elements, such as the DR 120 and the three logical switches 105, 110, and 135. In some embodiments, a separate component or components on the gateway host machines implements the distributed logical forwarding elements, with the SR operating as a VM, container, etc. In other embodiments, one component implements the distributed and centralized logical forwarding elements (e.g., a data plane development kit (DPDK-based) gateway). The definition of multiple routing components for logical routers and physical implementation of those routing components of some embodiments is described in greater detail in U.S. patent application Ser. No. 14/814,473, filed Jul. 30, 2015, which is incorporated herein by reference.

In addition, local controllers 225 and 230 operate on each of the gateway host machines 215 and 220, respectively. Though not shown, similar local controllers also operate on each of the host machines 205 in some embodiments. The local controller 225 configures the SR 125 according to configuration data (e.g., logical network configuration information, routing table, etc.) received from a centralized network controller. Similarly, the local controller 230 configures the SR 130 according to configuration data received from a centralized network controller (possibly the same centralized controller, and possibly a different centralized controller. The local controllers on each of the host machines 205 configure the MFEs 210 on those hosts.

In addition, the local controllers 225 and 230 of some embodiments select router identifiers for their respective SRs 125 and 130 based on the configuration data for the SRs. The local controllers perform this selection according to a selection algorithm, such as that shown in the process 300 described below. In some embodiments, either the local controller or the SR itself executes the dynamic routing protocol.

As shown, however, in other embodiments a separate routing protocol module operating on the gateway host machine executes the dynamic routing protocol for the centralized routing component. In this case, each of the gateway hosts 215 and 220 have routing protocol modules 235 and 240, respectively. In some embodiments, the routing protocol module executes one or more routing protocols for its respective SR. As shown, the SR 125 operating on the gateway host 215 includes two uplinks U1 and U2 that connect to external physical routers 245 and 250, respectively (e.g., through different physical interfaces of the gateway host 215). The second SR 130 operating on the gateway host 220 includes a third uplink U3 that connects to the external physical router 250.

The routing protocol module 235 generates route advertisement packets and sends them to both of the routers 245 and 250 using a selected router ID, in order to advertise routes for various logical network addresses and thus attract traffic sent to those addresses through the routers 245 and 250. For example, the routing protocol module 235 uses the selected router identifier in the router ID field of OSPF link state advertisement (LSA) packets or in the BGP identifier field of BGP messages.

The use of dynamic routing by logical routers is described in greater detail in U.S. Patent Publication 2015/0263946 and U.S. patent application Ser. No. 15/007,165 (filed Jan. 26, 2016), which are incorporated herein by reference. In addition, in some embodiments, the routing protocol modules 235 and 240 also execute the dynamic routing protocol for SRs of other logical routers that also operate on the same host machine.

Figure 3:
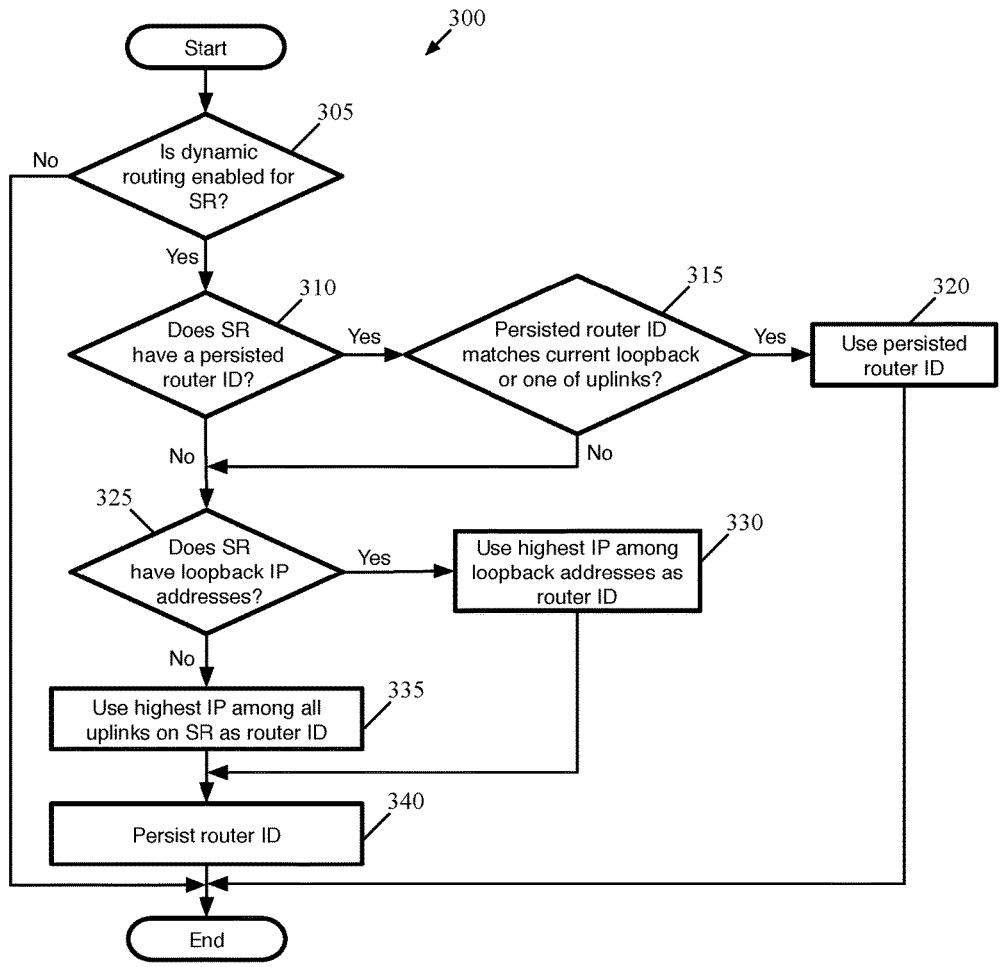
FIG. 3 conceptually illustrates a process of some embodiments for selecting a router identifier for a centralized routing component (SR) of a logical router.

FIG. 3 conceptually illustrates a process 300 of some embodiments for selecting a router identifier for a centralized routing component (SR) of a logical router. The process 300 is performed by the SR in some embodiments, by a routing protocol module, or by a network controller that manages the SR (e.g., a local controller operating on the same host machine as the SR). In some embodiments, the network controller uses the configuration data for the SR to select a router identifier, and provides this information to the routing protocol module in order for the routing protocol module to use the router identifier in its execution of the routing protocol or protocols.

As shown, the process begins by determining (at 305) whether dynamic routing is enabled for the SR. Some embodiments perform the process 300 when the SR initially starts up operations, or is forced to restart. For instance, if the entire host machine on which the SR operates restarts, then the SR (and the routing protocol module that executes dynamic routing for the SR) will need to restart its operations. Similarly, when the SR initially begins operations, the network controller needs to select a router identifier for the SR so that the routing protocol module can use the identifier for dynamic routing. Furthermore, as noted below, the address of one of the uplinks of the SR may be selected as the router identifier. If this uplink is removed or its address changed, then in this case the controller has to select a new router identifier. Similarly, if a loopback IP address used for the router identifier is deleted or an administrator-configured router identifier is removed (e.g., by a change in the logical network configuration), then the process to select a router identifier will begin again.

In some embodiments, whether dynamic routing is enabled is part of the logical router configuration used to define the SR. The network administrator can determine whether to advertise certain addresses (e.g., logical switch subnets, network address translation IP addresses, etc.) outside of the logical network, and thus whether dynamic routing is required. When dynamic routing is not enabled, no router identifier is needed, so the process 300 ends.

Assuming that dynamic routing is enabled, the process 300 determines (at 310) whether a routing identifier was persisted for the SR. Some embodiments persist the router identifier when the identifier is selected (as described below), so that if the SR and/or the dynamic routing protocol module is required to restart (e.g., because the entire host machine restarted), the same router identifier can be used after the restart (thereby avoiding interruption of the routing protocol).

However, before simply using the persisted identifier, the process determines whether the persisted identifier remains a valid identifier for the routing component. Thus, when the SR does have a persisted router identifier, the process determines (at 315) whether the persisted router identifier matches one of (i) an address of a current loopback interface of the SR or (ii) an address of one of the logical router uplinks assigned to the SR (i.e., a set of valid addresses for the router identifier). The uplink IP addresses are assigned as part of the logical router configuration (e.g., by a network administrator) in some embodiments. Some embodiments assign a loopback interface to all SRs, or SRs with more than one uplink, while other embodiments only assign a loopback interface to SRs if such an interface is configured by the network administrator.

When a router identifier has been persisted and is still in the set of valid addresses, the process 300 uses (at 320) the persisted router identifier (e.g., by providing this selection to the routing protocol module on the same host, along with the other configuration data necessary for the module to execute the routing protocol). This enables the routing protocol module to continue its connections with the same physical routers without having to restart the entire protocol with a new router identifier. The process then ends, as the router identifier is already persisted.

However, if no router identifier is persisted for the SR, or the persisted identifier no longer matches one of the valid addresses, then the process attempts to find an identifier from the current set of valid addresses. The process determines (at 325) whether the SR has at least one loopback address. As mentioned, some embodiments automatically assign a loopback interface in certain circumstances (e.g., if the SR has more than one uplink), while other embodiments only assign a loopback interface if the logical router configuration calls for one. In addition, in some cases, multiple loopback interfaces will be assigned to the SR.

When the SR has at least one loopback address, the process uses (at 330) the highest loopback interface address (i.e., IP address) as the router identifier. As the loopback interfaces are not associated with one of the physical network interface cards (NICs) of the host machine, they does not run the risk of going down. Thus, even if one of the uplinks of the SR goes down (e.g., because its affiliated NIC goes down), the dynamic routing can operate uninterrupted. Though this process uses the highest address among the loopback interfaces (e.g., with 127.0.0.1 being a higher address than 127.0.0.0, which in turn is a higher address than 126.255.255.255), other embodiments could use the lowest of the loopback interface addresses or use another technique to select one of the loopback interface addresses.

However, when the SR does not have a loopback interface, the process uses (at 335) the highest address (i.e., IP address) among all of the uplinks of the SR as the router identifier for the SR. The uplinks could all be on the same subnet (e.g., if they all have the same connectivity to the external network), or on different subnets (e.g., if they connect to different external routers). Though this process uses the highest address among the uplinks (e.g., with 10.8.8.12 being a higher address than 10.8.8.10, which in turn is a higher address than 9.128.128.255 or 10.7.15.12), other embodiments could use the lowest of the uplink addresses or use another technique to select one of the uplink addresses.

With the router identifier selected (and assigned for use by the routing protocol module), the process 300 persists (at 340) the router identifier for future use in case of a restart. That is, the network controller stores the router identifier as a persistent variable such that the information is not lost if the host machine restarts. Though not shown in the figure, if no loopback interface or uplink is available (e.g., because all uplinks on the routing component are inactive), then the network controller will not select a router identifier and dynamic routing is not used for the SR.

Figure 4:
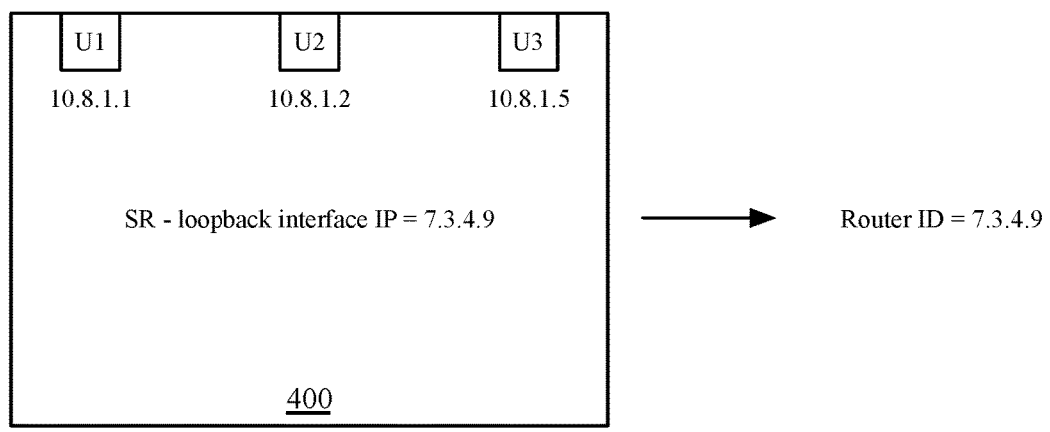
FIGS. 4 and 5 illustrate examples of the selection of router identifiers based on different SR configurations.
Figure 5:
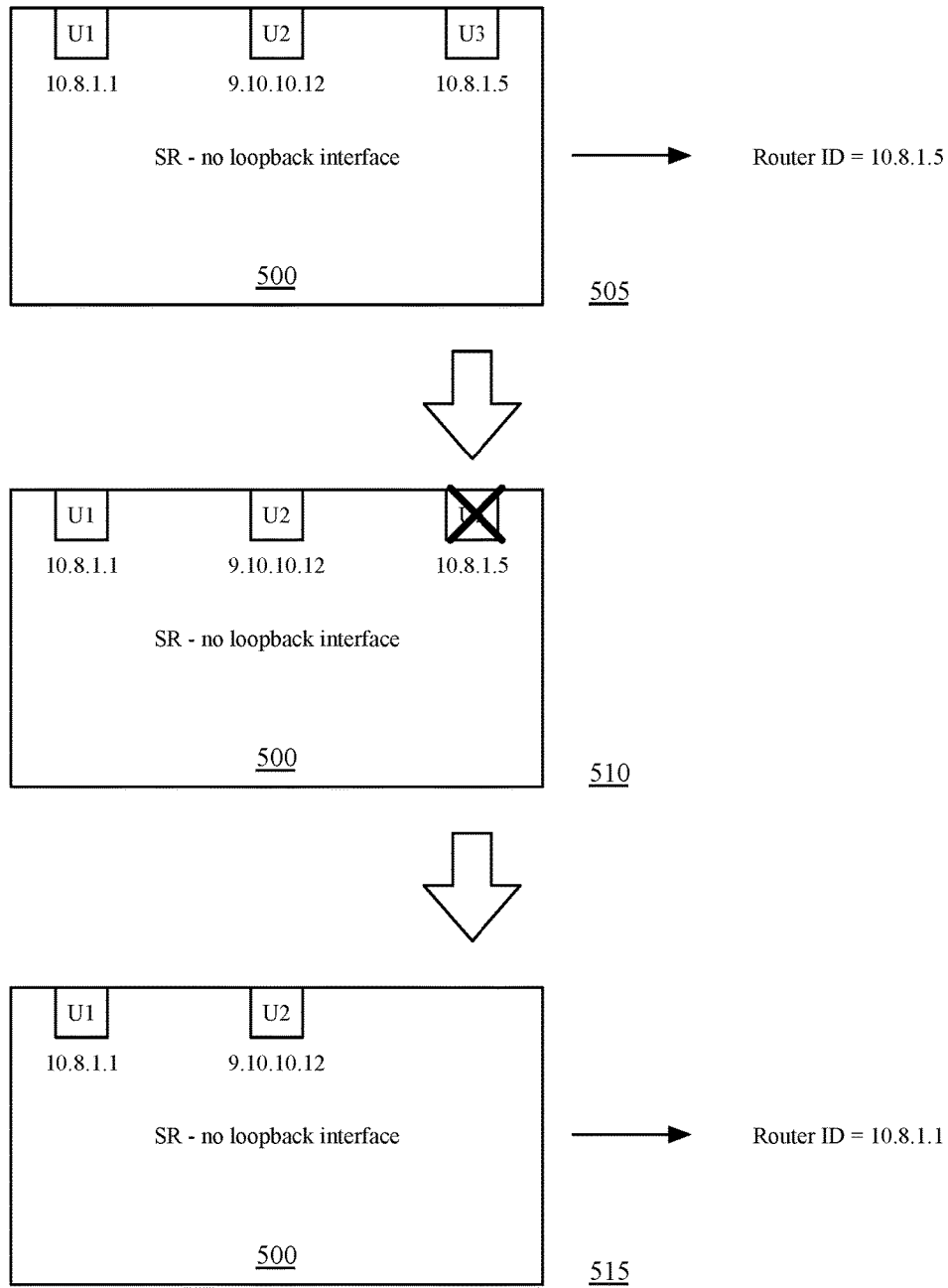

FIGS. 4 and 5 illustrate examples of the selection of router identifiers based on different SR configurations. In FIG. 4, a SR 400 is configured with three uplinks having IP addresses 10.8.1.1, 10.8.1.2, and 10.8.1.5 (i.e., all three uplinks are on the same subnet). In this example, the SR 400 is configured with a loopback interface that has an IP address of 7.3.4.9. Because a loopback interface is configured for the SR 400, as shown, its router identifier (as selected by, e.g., a local network controller operating on the same host machine as the SR 400) is the loopback interface IP address 7.3.4.9.

FIG. 5 illustrates a SR 500 that is configured with three uplinks, but one of which is deleted, over three stages 505-515. As shown in the first stage 505, the initial three uplinks have IP addresses 10.8.1.1, 9.10.10.12, and 10.8.1.5, as two of the uplinks (U1 and U3) are on the same subnet while the other uplink (U2) has different connectivity with the external network. In this example, the SR 500 does not have a loopback interface configured. As such, the highest IP address among the uplinks is selected (e.g., by a local network controller operating on the same host machine as the SR 500) as the router identifier. At the first stage 505, that highest uplink IP address is 10.8.1.5.

At the second stage 510, the third uplink U3 is deleted. This could occur, for example, because the network administrator reconfigured the logical router to which the SR 500 belongs to remove the uplink. As a result of the uplink being removed, the local controller re-initiates the router identifier selection process (e.g., the process 300). As shown at the third stage, the new router identifier for the SR 500 is the address of uplink U1, 10.8.1.1, as this is now the highest uplink IP address. It should be noted that, had one of U1 and U2 been deleted rather than the uplink U3 whose address was currently used as the router ID, some embodiments would not have reselected a router identifier. Similarly, even if a loopback interface or an uplink with a higher IP address was added, some embodiments do not reselect a router identifier for the sake of consistency. However, if the IP address of the selected uplink was changed, then the local controller would initiate the selection process again.

In some embodiments, the router identifier selected using the process 300 (or a similar process) may be overwritten based on administrator configuration of the logical network. The administrator may provide a router identifier for each of the SRs (or a subset of the SRs), which will be distributed to the local controller of the gateway host as a logical network configuration update and persisted in the system for use in routing protocols. Even if a router identifier has been selected using the process 300 (or a similar process), when the local controller receives the administrator-configured router identifier, this will be used instead. If the administrator later deletes the configured router identifier, then the local controller will be notified of this change and run the router identifier selection process (e.g., process 300) at that time.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
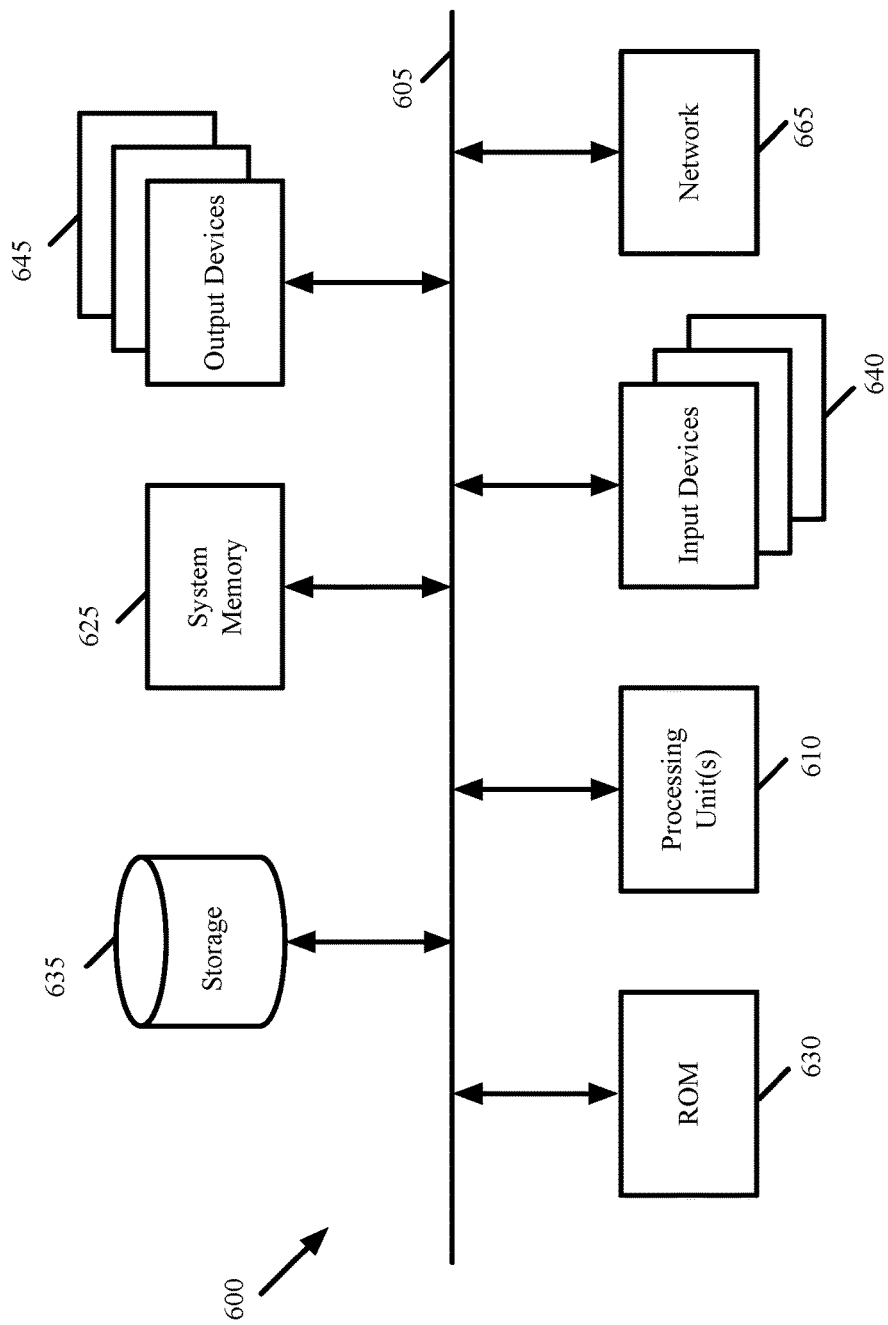
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method comprising:
    determining that a dynamic routing protocol is enabled for a centralized routing component of a logical router, wherein the dynamic routing protocol allows the centralized routing component to exchange routes with at least one physical router;
    based on the determination that the dynamic routing protocol is enabled, determining whether a router identifier was previously stored for the centralized routing component;
    when a router identifier was previously stored for the centralized routing component, assigning the stored router identifier as a router identifier for the centralized routing component to use for the dynamic routing protocol only when the stored router identifier matches one of a set of valid addresses for the centralized routing component; and
    when the centralized routing component does not have a previously stored router identifier that matches one of the set of valid addresses, assigning one of the set of valid addresses as the router identifier for the centralized routing component to use for the dynamic routing protocol according to a hierarchy among the set of valid addresses.

2. The method of claim 1, wherein the logical router comprises a plurality of centralized routing components and a distributed routing component.

3. The method of claim 2, wherein each centralized routing component is implemented on a single host machine and the distributed routing component is implemented on a plurality of host machines, including the host machines of each centralized routing component.

4. The method of claim 1, wherein the at least one physical router operates in a network external to the logical network.

5. The method of claim 1, wherein the method is performed by a network controller operating on a host machine with the centralized routing component.

6. The method of claim 5, wherein the network controller assigns router identifiers for a plurality of centralized routing components of different logical routers that operate on the host machine.

7. The method of claim 5, wherein dynamic routing protocol operations using the assigned router identifier are performed by a separate component operating on the host machine.

8. The method of claim 1, wherein the set of valid addresses comprises addresses of one or more uplink interfaces of the logical router that are assigned to the centralized routing component.

9. The method of claim 8, wherein the set of valid addresses further comprises an address of a loopback interface of the centralized routing component, wherein the loopback interface address is assigned as the router identifier for the centralized routing component.

10. The method of claim 8, wherein the centralized routing component does not have a loopback interface assigned, wherein a highest address of the uplink interface addresses is assigned as the router identifier for the centralized routing component.

11. The method of claim 8, wherein the centralized routing component does not have a loopback interface assigned, wherein a lowest address of the uplink interface addresses is assigned as the router identifier for the centralized routing component.

12. The method of claim 8, wherein the logical router comprises additional uplink interfaces that are assigned to different centralized routing components.

13. A non-transitory machine readable medium storing a program for execution by at least one processing unit, the program comprising sets of instructions for:
    determining that a dynamic routing protocol is enabled for a centralized routing component of a logical router, wherein the dynamic routing protocol allows the centralized routing component to exchange routes with at least one physical router;
    based on the determination that the dynamic routing protocol is enabled, determining whether a router identifier was previously stored for the centralized routing component;
    when a router identifier was previously stored for the centralized routing component, assigning the stored router identifier as a router identifier for the centralized routing component to use for the dynamic routing protocol only when the stored router identifier matches one of a set of valid addresses for the centralized routing component; and
    when the centralized routing component does not have a previously stored router identifier that matches one of the set of valid addresses, assigning one of the set of valid addresses as the router identifier for the centralized routing component to use for the dynamic routing protocol according to a hierarchy among the set of valid addresses.

14. The non-transitory machine readable medium of claim 13, wherein the logical router comprises a plurality of centralized routing components and a distributed routing component, wherein each centralized routing component is implemented on a single host machine and the distributed routing component is implemented on a plurality of host machines including the host machines of each centralized routing component.

15. The non-transitory machine readable medium of claim 13, wherein the at least one physical router operates in a network external to the logical network.

16. The non-transitory machine readable medium of claim 13, wherein the program is a network controller application executing on a host machine on which the centralized routing component also executes.

17. The non-transitory machine readable medium of claim 16, wherein the network controller application further comprises a set of instructions for assigning router identifiers for a plurality of centralized routing components of different logical routers that also execute on the host machine.

18. The non-transitory machine readable medium of claim 16, wherein a separate component also executes on the host machine to perform dynamic routing protocol operations using the assigned router identifier.

19. The non-transitory machine readable medium of claim 13, wherein the set of valid addresses comprises addresses of one or more uplink interfaces of the logical router that are assigned to the centralized routing component.

20. The non-transitory machine readable medium of claim 19, wherein the set of valid addresses further comprises addresses of one or more loopback interfaces of the centralized routing component, wherein one of the loopback interface addresses is assigned as the router identifier for the centralized routing component.

21. The non-transitory machine readable medium of claim 19, wherein the centralized routing component does not have a loopback interface assigned, wherein a highest address of the uplink interface addresses is assigned as the router identifier for the centralized routing component.

* * * * *